United States Patent
Erdmann et al.

(10) Patent No.: US 9,774,217 B2
(45) Date of Patent: Sep. 26, 2017

(54) SYSTEM, DEVICE AND METHOD FOR CONFIGURING AND POWERING A BATTERYLESS DEVICE

(75) Inventors: Bozena Erdmann, Eindhoven (NL); Armand Michel Marie Lelkens, Eindhoven (NL); Willem Franke Pasveer, Eindhoven (NL); Eberhard Waffenschmidt, Aachen (DE); Achim Hilgers, Alsdorf (DE); Biju Kumar Sreedharan Nair, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 787 days.

(21) Appl. No.: 13/202,196

(22) PCT Filed: Feb. 23, 2010

(86) PCT No.: PCT/IB2010/050788
§ 371 (c)(1),
(2), (4) Date: Aug. 18, 2011

(87) PCT Pub. No.: WO2010/100582
PCT Pub. Date: Sep. 10, 2010

(65) Prior Publication Data
US 2011/0304219 A1    Dec. 15, 2011

(30) Foreign Application Priority Data
Mar. 2, 2009 (EP) ..................... 09305188

(51) Int. Cl.
H01F 27/42       (2006.01)
H01F 37/00       (2006.01)
(Continued)

(52) U.S. Cl.
CPC .............. *H02J 17/00* (2013.01); *H02J 5/005* (2013.01); *H02J 7/00* (2013.01); *H02J 7/02* (2013.01)

(58) Field of Classification Search
CPC .. H02J 5/005; H02J 7/025; H02J 17/00; H02J 7/00; H02J 7/02; H02J 7/32; H02J 7/35;
(Continued)

(56) References Cited

U.S. PATENT DOCUMENTS 7,170,201 B2 * 1/2007 Hamel ................ B60C 23/0411
307/151
7,429,805 B2 * 9/2008 Hamel ................ B60C 23/0411
307/9.1
(Continued)

FOREIGN PATENT DOCUMENTS

JP    11353438 A    12/1999
JP    2002281684 A    9/2002
(Continued)

*Primary Examiner* — Rexford Barnie
*Assistant Examiner* — Jagdeep Dhillon

(57) ABSTRACT

System for configuring and powering a wireless batteryless device, the system comprising: a wireless batteryless device (A) comprising: a built-in harvester (12) for harvesting energy from a first energy source, for example ambient energy, means for communicating wirelessly, —and an external device (B) comprising: —a second power source (16), —means (17) for converting energy supplied by the second power source into energy suitable for being harvested in the harvester of the batteryless device, means (18) for wirelessly supplying the batteryless device with the converted energy via the built-in harvester, and means for communicating with the batteryless device. The invention also relates to an external device therefore, and a method for configuring and powering a batteryless device.

15 Claims, 1 Drawing Sheet

(51) Int. Cl.
*H01F 38/00* (2006.01)
*H02J 17/00* (2006.01)
*H02J 7/00* (2006.01)
*H02J 5/00* (2016.01)
*H02J 7/02* (2016.01)

(58) Field of Classification Search
CPC .......... H01F 38/14; B60L 11/182; B60L 1/00; B60L 1/02; G05F 3/00; H04B 1/38; H04B 1/00
USPC ..... 307/104, 151, 9.1, 149, 66, 64; 455/572, 455/573; 320/101, 107, 108, 109, 137; 310/339
See application file for complete search history.

(56) References Cited

U.S. PATENT DOCUMENTS

| | | | |
|---|---|---|---|
| 8,090,414 B2* | 1/2012 | Mickle | G06K 19/0701 320/101 |
| 2005/0017602 A1* | 1/2005 | Arms | B60C 23/0411 310/339 |
| 2005/0104973 A1 | 5/2005 | Lizuka | |
| 2005/0186994 A1* | 8/2005 | Rahmel | H02J 17/00 455/572 |
| 2005/0270142 A1 | 12/2005 | Moreaux | |
| 2007/0109116 A1 | 5/2007 | Burr | |
| 2007/0114422 A1 | 5/2007 | Berkcan | |
| 2007/0296558 A1 | 12/2007 | Jung | |
| 2008/0123581 A1 | 5/2008 | Wells | |
| 2008/0174410 A1 | 7/2008 | Sarangapani | |
| 2009/0212665 A1* | 8/2009 | Koser | B60C 23/0411 310/339 |
| 2009/0230924 A1* | 9/2009 | Wright | H02N 2/181 320/148 |
| 2012/0025752 A1* | 2/2012 | Teggatz | H02J 7/35 320/101 |

FOREIGN PATENT DOCUMENTS

| | | |
|---|---|---|
| JP | 2004252537 A | 9/2004 |
| WO | WO2006057864 A1 | 6/2006 |
| WO | WO2006066175 A1 | 6/2006 |

* cited by examiner

SYSTEM, DEVICE AND METHOD FOR CONFIGURING AND POWERING A BATTERYLESS DEVICE

FIELD OF THE INVENTION

The present invention relates to a system, a device and a method for configuring and powering a batteryless device.

This invention is, for example, relevant for performing commissioning procedures in batteryless energy-harvesting devices such as light switches, controller devices, and sensor devices.

BACKGROUND OF THE INVENTION

Wireless control networks have recently become a ubiquitous trend in the field of communication, especially for building management systems. Wireless technologies present major advantages in terms of freedom of placement, portability, and installation cost reduction, since there is no need for drawing cables and drilling. Thus, such technologies are particularly attractive for interconnecting detecting, automation, control or monitoring systems using sensor devices such as light switches, light dimmers, wireless remote controllers, movement or light detectors, that have to be set up in distant places one from the other and from the devices they control, e.g. lights.

One of the drawbacks appearing in networks of the like relates to device powering. Indeed, since the devices are not wired, they can not anymore receive power necessary for performing all the operations required in the network from the mains or via the connection with the controller. Thus, it has been envisaged to equip such devices with built-in batteries. However, since the devices are quite size-constrained, batteries may not be of a large size, which results either in a reduced device lifetime, or in labour intensive battery replacement.

It has been suggested to remedy this issue by equipping sensor devices with self-sustained energy sources that harvest energy from their environment. Still, the amount of energy achievable by off-the-shelf energy harvesters is very limited, which means that the features and functions of the batteryless devices are heavily restricted accordingly.

On another side, we have noticed that some energy-costly procedures, such as configuration procedures, have to be performed only once, or only a small amount of occurrences, and not all along the lifetime of a device.

SUMMARY OF THE INVENTION

Thus, it is an object of the invention to propose a system and a method for powering and configuring system that allows wirelessly supplying a batteryless device with additional or alternative energy only during a limited period of time, and dedicating this additional or alternative energy to specific procedures.

It is also an object of the invention to provide a system and a method wherein an off the shelf batteryless device can be used, without any modification, especially also no modification to the energy harvesting module.

Another object of the invention is to provide a system and method that allow limiting communications of the batteryless device for saving energy in the configuration procedure.

To this end, the invention provides a system for configuring and powering a wireless batteryless device, the system comprising:

a wireless batteryless device comprising:

a built-in harvester for harvesting energy from a first energy source,
means for communicating wirelessly, and an external device comprising:

a second power source,
means for converting energy supplied by the second power source into energy suitable for being harvested in the harvester of the batteryless device,
means for wirelessly supplying the batteryless device with the converted energy via the built-in harvester, and
means for communicating with the batteryless device.

The converting means included in the external device make it possible to use the same harvester, i.e. the same hardware element of the batteryless device, for both energy supply methods. This feature allows for keeping the low cost and compact form factor of the energy-harvesting module incorporated in the batteryless device and thus the batteryless device itself. Moreover, in an embodiment of the invention the system comprises means for adapting characteristics of the wirelessly supplied energy to the characteristics of the batteryless device and/or of the harvester, which makes it possible to use an off-the-shelf batteryless device without having to modify it, since the external device can both convert energy into the correct type of energy, and adapt its characteristics.

In one embodiment, the external device performs configuration actions of the batteryless device. Advantageously, in one embodiment, these actions are those requiring a user input and the external device thus comprises means for a user interaction, e.g. a user interface.

Different configurations for the external device, the batteryless device and the type of energy may be used in a system according to the invention. There will be further detailed in connection with figures.

The present invention also relates to an external device for being used in a system according to the invention.

Another aspect of the invention relates to a method for configuring and powering a wireless batteryless device comprising a harvester for harvesting ambient energy, via an external device, comprising the following steps:

the external device generating energy via an included power source,
the external device converting the generated energy in energy suitable to be harvested in the harvester,
the external device wirelessly supplying the batteryless device with converted energy.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a system for powering and configuring a wireless batteryless device. More precisely, the present invention provides an alternative energy supply to a batteryless device for the time of, and for enabling configuration procedures, for example commissioning and maintenance operations.

A batteryless device used in the present invention is equipped with a built-in harvester, for harvesting energy from a first energy source, namely ambient energy from its environment. The alternative energy used for configuration procedures is supplied via an external device comprising a second power source. Both the ambient energy and the external energy can be harvested by the same built-in harvesting circuit of the batteryless device, without any changes or special design consideration for the harvesting circuit itself. Energy supplied by the first source, or ambient energy can be of different types:

- in a first example, electromagnetic energy is used, wherein the built-in harvester consists of a permanent magnet moving with respect to a coil when mechanically actuated by a user,
- in another example, ambient light energy, solar or artificial, is used, wherein and the built-in harvester is a solar cell.

Any other type of energy can be used in the present invention, with the corresponding ambient energy types and harvesters. The external device comprises converting means, so that the energy supplied to the batteryless device is suitable for being harvested by the built-in harvester of the batteryless device. Furthermore, the external device also comprises wireless communication means.

We will then describe several embodiments of a system according to the invention.

In a first embodiment, the external device is a handheld device with a rich user interface, in a form of, for example, a Personal Digital Assistant (PDA). In this embodiment, the batteryless device is wirelessly supplied with energy via the energy providing function of the handheld device.

Using a device with a rich user interface makes it possible for a user to conveniently perform configuration actions requiring user input, for example the selection of other devices to be controlled by or to communicate with the batteryless device.

Figure 1:
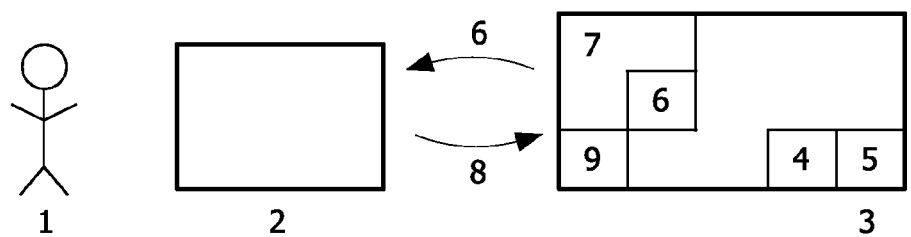
FIG. 1 shows a global view of a system according to the invention.

A method according to the invention, implemented according to this embodiment, is described below, in connection with FIG. 1. A user 1 has a PDA 2, provided with an energy providing function. User 1 puts the PDA 2 in the close vicinity of a batteryless device 3 to be configured. The batteryless device 3 comprises a harvester 4 for harvesting ambient energy, and a wireless communication interface 9. Within the meaning of the present invention, close vicinity is defined as a zone within which the PDA 2 can efficiently provide the batteryless device with power. Then, the PDA 2 starts communicating with the device 3 to read out data 6 via the communication interface 9, this data being part of all data stored in a memory 7 of this device 3. Read out data 6 is, for example, the MAC address or description of the device.

Based on this data, user 1 can then perform user configuration actions of the batteryless device 3, by commanding the PDA 2 via a user interface. User configuration actions are, for example, network discovery, discovery of to-be-controlled actuator-type devices, establishment of groups and bindings. It has to be mentioned here that this configuration step does not require the PDA 2 to be situated in close vicinity of the batteryless device 3, since all necessary data 6 for performing configuration has been read out previously, and thus no feed-back to and/or from the batteryless device is required.

Then, as soon as these user configuration actions are terminated, PDA 2 may configure the batteryless device with determined parameters 8, such as network identifier, addresses of bound devices, and group membership. Contrary to the preceding actions, this parameter transmission requires the PDA 2 to be situated in close vicinity of the batteryless device, to supply the batteryless device with the energy required for radio reception and for persistently storing the determined parameters 8, for example in a non-volatile memory. While in the vicinity, PDA 2 also supplies the batteryless device with energy, for enabling the batteryless device to perform itself some network configuration actions. This energy is harvested in harvester 4, without needing to modify the hardware composition of the batteryless device 3. In the case where the batteryless device is part of a network compliant with Zigbee or with 802.15.4, network configuration actions may consist in parent selection, association, and address assignment.

In addition, this method implementation may comprise a step for the PDA 2 to detect characteristics of the batteryless device 3 or, more precisely, of the harvester 4, so as to supply energy with characteristics, like input voltage, power and frequency, adapted to the batteryless device 3.

Another method implementation will now be described:
- in a first step, PDA 2 reads out all data stored in the memory 4 of the batteryless device 3. This data includes, for example, supported attributes, clusters or commands.
- in a second step, PDA 2 temporarily assumes the identity of the batteryless device, to perform all configuration actions on behalf of the batteryless device, i.e. both user configuration actions and network configuration action, as described before,
- in a third step, PDA 2 uploads in the batteryless memory complete network and application configuration, thus requiring no further commissioning actions by the batteryless device.

These two method implementations have been described in the case where the external power source is embedded in a handheld device. However, similar implementations and role distribution may be carried out with other embodiments thereafter described.

In a second embodiment of the invention, the external device is an add-on device to the batteryless device, which can be temporarily fixed and then tracelessly removed. When the add-on device is attached to the batteryless device, it supplies the batteryless device with energy necessary for performing commissioning and maintenance operations such as installation testing, network scanning, association, address assignment, address conflict resolution, security key establishment, device and service discovery, binding, binding testing, and node configuration in as far as possible self-organizing manner, as would be the case for battery-powered or mains-powered devices.

The add-on device is such that all user configuration operations can be performed intuitively by a user of the device, without requiring any additional tool.

Moreover, the add-on device can be removed without damaging either itself or the batteryless device, and then can be used for configuring several batteryless devices.

In an advantageous embodiment, the add-on device is realized as a relatively low-cost device. Thus, in large-scale installations such as multi-store office buildings, several add-on devices can be provided, enabling commissioning of several batteryless devices at the same time. In an example of realization, the add-on device is equipped with a wireless power coil, a power source, for example a battery or a solar source, and a fixing mechanism, like a spring-based halters, making it possible to attach the add-on device and then to easily release it. Other possible features of such an add-on device include:

- a simple user interface, e.g. a display, to inform the user about the configuration progress, and/or final status of the batteryless device,
- means for indicating the end of commissioning operation, different from a display, e.g. a LED. This indication allows the user to know when he can remove the device. In the case where several add-on devices are used at the same time, those devices may be equipped with means, for example wireless communication interface, for providing information to a centralized control unit, which for example displays a floor plan indicating the status of all the add-on devices.
- means for a user to manually activate the energy provisioning operation,
- alternatively, means for detecting that the add-on device is attached to the batteryless device and for automatically activating the wireless power operation at that time, and means for detecting removing of the add-on device and automatically deactivating the wireless power function.

In an exemplary configuration, the wireless power function of an add-on device can be remotely activated, for example via wireless communication means, thus allowing limitation of the energy consumption of the add-on device itself as well as achievement of special configuration targets, like appropriate network topology or appropriate amount or order of devices performing the configuration operation.

In a third embodiment of the invention, the external device is a handheld device with means for attaching the batteryless device to the external device for the duration of the configuration procedure, so that the batteryless can be wirelessly supplied with energy.

This allows the user to benefit from the extensive functions of the user interface of the external device, without the inconvenience of actively preserving particular mutual device orientation.

The three embodiments of a system according to the invention described above can be realized using different energy harvesters. For example, if the built-in harvester of the batteryless device is an electromagnetic harvester, then the PDA may emit wireless power, in form of electromagnetic wave of appropriate waveform, frequency and power, to be harvested by the built-in harvester of the batteryless device. Wireless power is, for example, generated via a built-in coil with a magnetic core whose characteristics, like the number and geometrical orientation of windings are chosen depending on the harvester. In another example, if the built-in harvester of the batteryless device is an electro-mechanical harvester, then the PDA may, for example via built in mechanical component, generate the required mechanical movement of appropriate type, strength, direction and repetition frequency. In yet another example, if the built-in harvester is a solar cell for harvesting ambient lighting, artificial or solar, then the PDA may, for example via a built-in light source such as a LED or an OLED, of appropriate type and geometrical orientation, emit light of appropriate wavelength and intensity, to be harvested by the built-in harvester of the batteryless device. Further examples for externally supplying power to batteryless devices containing other built-in energy-harvesting modules, for example harvesting vibration, thermal, radiation, electrostatic or flow energy, will also be apparent to a person skilled in the art.

Figure 2:
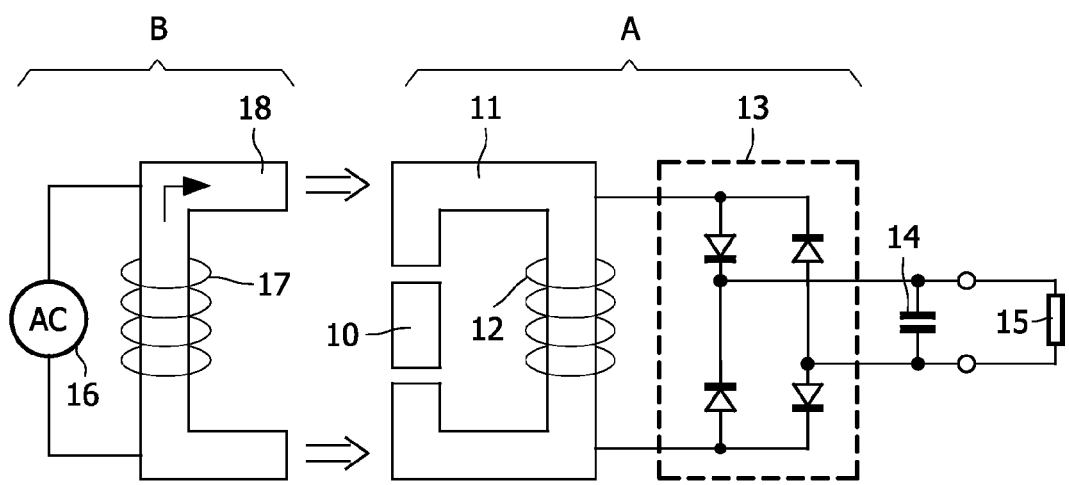
FIG. 2 shows an exemplary embodiment of a system according to the invention.

A more detailed realization of a system according to the invention will now be described in connection with FIG. 2. The batteryless device A comprises an energy harvester in the form of a permanent magnet 10 situated in a softmagnetic core 11. When a user mechanically operates the permanent magnet 10 by turning it once, the direction of the magnetic flux existing in the softmagnetic core 11 reverses. Thus, a voltage pulse is generated in an energy harvesting coil 12. Depending on the initial direction of the magnetic flux, the generated pulse is either a positive or a negative one. The batteryless device thus includes a rectifier 13, under the form of a diode bridge, for turning the pulse into a positive pulse. This positive pulse is thus used to fill in an energy storage 14, namely to charge a capacitor, who then supplies a load 15. However, as said in the preamble of the present invention, such a source does not provide enough energy for performing operations like commissioning procedures.

Thus, for performing such operations, an external device B provides additional energy. The external device is a handheld device containing an inductive transmitter, comprising a power source 16 that generates an AC current. This current is then fed into a converter, comprising a transmitter winding 17, capable of generating an alternating magnet flux. The transmitter winding 17 is wound around a U-shape softmagnetic core 18 with the legs pointing toward the energy harvesting coil 12, so that the flux is guided into direction of the batteryless device. Thus, a significant amount of the alternating magnetic flux generated by the transmitter winding then flows through the energy harvesting coil 12 and induces an alternating voltage. This alternating voltage is rectified by the existing rectifier 13 and used to charge the capacitor 14 and power the load 15.

In this specific embodiment, the transmitter transmits a continuous series of alternating pulses and not only a single pulse, thus the amount of useable energy is much higher than during regular mechanical operation. This higher amount of energy makes it possible to supply a much more advanced electronic circuit and a radio, which can transmit more than a short command but is able to receive and transmit a sophisticated protocol for the commissioning of the switch.

The present invention is more specifically dedicated to batteryless devices for control networks, for example lighting control networks, building automation and home automation.

In the present specification and claims the word "a" or "an" preceding an element does not exclude the presence of a plurality of such elements. Further, the word "comprising" does not exclude the presence of other elements or steps than those listed.

The inclusion of reference signs in parentheses in the claims is intended to aid understanding and is not intended to be limiting.

From reading the present disclosure, other modifications will be apparent to persons skilled in the art. Such modifications may involve other features which are already known in the art of wireless communication and the art of batteryless devices, and which may be used instead of or in addition to features already described herein.

The invention claimed is:

1. A system for configuring and powering a wireless batteryless device, the system comprising:
   the wireless batteryless device comprising:
      a built-in harvester for harvesting an ambient energy from a first energy source, wherein the first energy source is the ambient energy from an environment of the wireless batteryless device; and a wireless communication interface to communicate with an external device to perform installation, configuration or maintenance procedures, wherein the installation, configuration or maintenance procedures include one or more of installation testing, network scanning, association, address assignment, address conflict resolution, security key establishment, device and service discovery, binding, binding testing, and node configuration, and receive external energy wirelessly from a second power source in the external device, wherein the installation, configuration or maintenance procedures requires additional energy than normal operation of the wireless batteryless device and is required for a limited period of time, and to convert the external energy into a converted external energy suitable for harvesting in the harvester, the external energy being used at least partially to execute the installation, configuration or maintenance procedure.

2. The system as recited in claim 1, wherein the external device is further configured to adapt a characteristic of the external energy to a characteristic of the wireless batteryless device.

3. The system as recited in claim 1, wherein the external device is a handheld device.

4. The system as recited in claim 1, wherein the external device is an add-on device configured to be temporarily fixed to and removed from the wireless batteryless device without a trace.

5. The system as recited in claim 1, wherein
the wireless batteryless device further comprises a memory for storing data, and
the external device is further configured to read the data stored in the memory of the wireless batteryless device, and to extract configuration information for the wireless batteryless devices from the data.

6. The system as recited in claim 1, wherein the external device further comprises a user interface.

7. The system as recited in claim 1, wherein the ambient energy is generated on a mechanical action of a user operating the wireless batteryless device,
the harvester comprises a magnet and a coil, wherein the magnet and the coil move with respect to one another and generate a voltage pulse in the harvester, and
the second power source of the external device comprises an inductive transmitter, the inductive transmitter having an AC generator and a transmitter winding.

8. The system as recited in claim 1, wherein
the ambient energy is an ambient light from a natural and/or an artificial light source,
the harvester comprises a solar cell, and
the second power source of the external device is a light source.

9. A method for configuring and powering a wireless batteryless device, wherein the wireless batteryless device comprises a harvester for harvesting an ambient energy from a first energy source wherein the first energy source is the ambient energy from an environment of the wireless batteryless device in a form of electromagnetic energy or ambient light energy, and for harvesting an external energy received wirelessly from a second power source, via an external device, the method comprising:
initiating, by the external device, installation, configuration or maintenance procedures, wherein the installation, configuration or maintenance procedures include one or more of installation testing, network scanning, association, address assignment, address conflict resolution, security key establishment, device and service discovery, binding, binding testing, and node configuration,
generating, by the external device, the external energy via the second power source required by the installation, configuration or maintenance procedures,
converting, by the external device, the generated external energy into a converted energy suitable to be harvested in the harvester,
the external device wirelessly supplying the wireless batteryless device with the converted energy, the converted energy being used at least partially for executing the installation, configuration or maintenance procedures of the wireless batteryless device, and
wherein the installation, configuration or maintenance procedures requires additional energy than normal operation of the wireless batteryless device and is required for a limited period of time.

10. The method as recited in claim 9, further comprising the external device adapting at least one characteristic of the wireless batteryless device.

11. The method as recited in claim 9, further comprising:
the external device supplying the wireless batteryless device with the converted energy necessary for sending, receiving, processing and persistently storing a relevant configuration data,
a user performing a first configuration action on the wireless batteryless device via an interface of the wireless batteryless device, and the wireless batteryless device performing a second configuration action.

12. The method as recited in claim 9, further comprising:
the external device reading a set of data from a memory of the wireless batteryless device,
a user performing a first configuration action on the wireless batteryless device via an interface on the external device, and
supplying the wireless batteryless device with the converted energy necessary for receiving and persistently storing a relevant user configuration data,
supplying the wireless batteryless device with a quantity of the converted energy necessary for a second configuration action performed by the wireless batteryless device.

13. The method as recited in claim 9, further comprising:
the external device reading a set of data stored in a memory of the wireless batteryless device,
a user performing a first configuration action for the wireless batteryless device via an interface on the external power source, and
supplying the wireless batteryless device with a quantity of energy necessary for a second configuration action performed by the wireless batteryless device.

14. A system for configuring and powering a wireless batteryless device, comprising:
a built-in harvester for harvesting an ambient energy from a first energy source, wherein the first energy source is the ambient energy from an environment of the wireless batteryless device; and
an external device comprising a second power source, the external device configured to:
initiate an installation, configuration or maintenance procedures, wherein the installation, configuration or maintenance procedures, include one or more of installation testing, network scanning, association, address assignment, address conflict resolution, security key establishment, device and service discovery, binding, binding testing, and node configuration;

convert an external energy supplied by the second power source into a converted external energy suitable for harvesting in the harvester of the wireless batteryless device; and supply the wireless batteryless device with the converted external energy over a wireless connection, only when a specific configuration of the wireless batteryless device is initiated by the external device and is required for a limited time, such that both the ambient energy and the converted external energy are harvested by the harvester, the external energy being used at least partially for executing the installation, configuration or maintenance procedures in the wireless batteryless device initiated by the external device.

15. The system for configuring and powering a wireless batteryless device of claim 1, wherein the external energy is dedicated to execute the installation, configuration or maintenance procedure.

* * * * *